(12) United States Patent
Noda et al.

(10) Patent No.: US 6,576,689 B2
(45) Date of Patent: Jun. 10, 2003

(54) WATER BASED COATING COMPOSITION

(75) Inventors: Sumio Noda, Kanagawa-ken (JP); Reijiro Nishida, Kanagawa-ken (JP); Makoto Asakura, Kanagawa-ken (JP); Masaki Murase, Kanagawa-ken (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 70 days.

(21) Appl. No.: 09/977,946

(22) Filed: Oct. 17, 2001

(65) Prior Publication Data

US 2002/0086923 A1 Jul. 4, 2002

(30) Foreign Application Priority Data

Oct. 20, 2000 (JP) .......................................... 2000/320113

(51) Int. Cl.$^7$ .............................. C08K 3/20; C08L 63/02

(52) U.S. Cl. ........................ 523/423; 523/406; 523/407; 523/412; 525/327.4; 525/329.7; 525/533

(58) Field of Search ................................. 523/406, 407, 523/412, 423; 525/327.4, 329.7, 533

(56) References Cited

U.S. PATENT DOCUMENTS

| 4,458,040 A | | 7/1984 | Suzuki et al. |
| 4,482,673 A | | 11/1984 | Brown et al. |
| 4,585,813 A | | 4/1986 | Brown et al. |
| 5,840,384 A | * | 11/1998 | Noda .................. 428/35.8 |

FOREIGN PATENT DOCUMENTS

| JP | 37026/84 | 9/1984 |
| JP | 41934/88 | 8/1988 |
| JP | 329974/94 | 11/1994 |
| JP | 160029/96 | 6/1996 |

* cited by examiner

Primary Examiner—Robert Dawson
Assistant Examiner—D. Aylward
(74) Attorney, Agent, or Firm—Fisher, Christen & Sabol

(57) ABSTRACT

A water based coating composition prepared by reacting an epoxy resin (A) having a bisphenol A skeletal structure and a carboxyl group-containing acrylic resin (B) in the presence of an amine compound to form an acrylic-modified epoxy resin (C), and neutralizing, and dispersing the acrylic-modified epoxy resin (C) into an aqueous medium, an amount of a quaternary ammonium salt in the acrylic-modified epoxy resin (C) being in the range of $3.0 \times 10^{-4}$ mol or less per one gram of the resin.

7 Claims, No Drawings

WATER BASED COATING COMPOSITION

This application has priority benefit of Japanese Patent Application No. 00/320113, filed on Oct. 20, 2000.

BACKGROUND ART (1) Field of the Invention

The present invention relates to a water based coating composition, a water based coating composition useful for coating the internal surface of a food can, and particularly a water based coating composition capable of forming a coating film showing a controlled eluation of bisphenol A.

(2) Description of Background Art

Recently, a water based coating composition is widely used in the art as a coating composition to be applied onto the internal surface of a can from the standpoints of working hygiene, environmental conservation and safety to fire. The water based coating composition applied onto the internal surface of the can may include ones containing mainly an esterification reaction product between an epoxy resin and a carboxyl group-containing acrylic resin as a resin component as disclosed, for example, in Japanese Patent Publication No. 41934/88 (U.S. Pat. No. 4,585,813 and U.S. Pat. No. 4,482,673) and Japanese Patent Publication No. 37026/84 (U.S. Pat. No. 4,458,040), Japanese Patent Application Laid-Open No. 329974/94, etc.

However, the above water based coating compositions use, AS A STARTING EPOXY RESIN, a high molecular weight epoxy resin obtained by reacting a low molecular weight epoxy resin with bisphenol A, resulting in that an unreacted bisphenol A remains in the coating composition. Recently, the bisphenol A causes troubles as an exogenous endcrine-disturbing chemical substance or an environmental hormone. Therefore, such a water based coating composition as to be free of bisphenol A remaining therein and as not to cause eluation of bisphenol A from a resulting coating film has been demanded. In connection therewith, the use of a bisphenols-undetected low molecular weight epoxy resin only as a starting epoxy resin may result a water based coating composition may form a coating film reduced in coating film performances such as coating workability, adhesion properties to a substrate, flavor properties and the like so as to be unsuitable as the coating composition applied onto the internal surface of the can. On the other hand, attempts to use an epoxy resin prepared by extracting and removing low molecular weight components including unreacted bisphenol A from the above high molecular weight epoxy resin as a starting epoxy resin have been made with the result that a satisfactory contact of the eluation of bisphenol A from the coating film has not been achieved.

SUMMARY OF THE INVENTION

It is an object of the present invention to provide a water based coating composition capable of forming a coating film not eluating bisphenol A therefrom without reducing coating film performances demanded on the coating film applied onto the internal surface of the can, for example, coating workability, adhesion properties, retorting resistant properties, mar resistance properties, hygienical properties, flavor properties and the like.

The present inventors made intensive studies to solve the above problems and percieved that the bisphenol A produced by thermal decomposition of the epoxy resin as a heat curing temperature of the coating film is increased may eluate from the coating film, resulting in finding out that a specified amount of the quaternary ammonium salt in the acrylic-modified epoxy resin makes it possible to form a coating film free of eluation of bisphenol A without reducing performances required for the coating film to complete the present invention.

That is, the present invention provides a water based coating composition prepared by reacting an epoxy resin (A) having a bisphenol A skeletal structure and a carboxyl group-containing acrylic resin in the presence of an amine compound to form an acrylic-modified epoxy resin (C), and neutralizing, and dispersing the acrylic-modified epoxy resin (C) into an aqueous medium, an amount of a quaternary ammonium salt in the acrylic-modified epoxy resin being in the range of $3.0 \times 10^{-4}$ mol or less per one gram of the resin (hereinafter may be referred to simply as $3.0 \times 10^{-4}$ mol/g or less).

DETAILED DESCRIPTION OF THE INVENTION

Epoxy Resin (A)

In the composition of the present invention, the epoxy resin (A) used in the preparation of the acrylic-modified epoxy resin is an epoxy resin having a bisphenol A skeletal structure, and may include the following bisphenol A based epoxy resin (a), a composite bisphenol based epoxy resin (b) having a bisphenol A skeletal structure and bisphenol F skeletal structure in one molecule, and mixture of the above (a) and (b).

Bisphenol A Based Epoxy Resin (a)

The bisphenol A based epoxy resin (a) may preferably include ones having a number average molecular weight in the range of 4,000 to 30,000, preferably 5,000 to 30,000, and an epoxy equivalent in the range of 2,000 to 10,000, preferably 2,500 to 10,000 from the standpoints of disversion stability in the aqueous medium, fabrication properties, hygienical properties and the like of the resulting coating film.

The bisphenol A based epoxy resin (a) may be prepared by one step polymerization method between bisphenol A and epichlorohydrin, or by two step polymerization method comprising adding bisphenol A to a bisphenol A based epoxy resin having a relatively low epoxy equivalent.

The relatively low epoxy equivalent bisphenol A based epoxy resin may include ones having an epoxy equivalent in the range of about 160 to about 2,000, and may include commercially available epoxy resins, for example, Epikote 828EL, Epikote 1001, Epikote 1004 and Epikote 1007 (trade names, marketed by Japan Epoxy Resin Co., Ltd. respectively); Araldite AER 250, Araldite AER 260, Araldite AER 6071, Araldite AER 6004 and Araldite AER 6007 (trade names, marketed by Asahi Kasei Epoxy Co., Ltd. respectively); Epomik R140, Epomik R301, Epomik E304 and Epomik R307 (trade names, marketed by Mitsui Chemicals, respectively); Adekaresin EP-4100 and Adekaresin EP-5100 (trade names, marketed by Asahi Denka Kogyo K.K., respectively); and the like.

The bisphenol A based epoxy resin (a) in the present invention may include commercially available ones such as Epikote 1010, Epikote 1256B40, Epikote 1256 (trade names, marketed by Japan Epoxy Resin Co., Ltd. respectively), and the like. The bisphenol A based epoxy resin (a) may also include a modified bisphenol A based epoxy resin prepared by modifying the bisphenol A based epoxy resin with a dibasic acid. The bisphenol A based epoxy resin to be reacted with the dibasic acid may preferably include ones having a number average molecular weight in the range of 2,000 to 8,000 and an epoxy equivalent in the range of 1,000 to 4,000. The dibasic acid may include a compound represented by the general formula: HOOC—$(CH_2)_n$—COOH where n is an integer of 1 to 12, specifically succinic acid, adipic acid, pimelic acid, azelaic acid, sebacic acid, dodecane diaid, hexahydrophthalic acid and the like, particularly adipic acid is preferable.

The modified bisphenol A based epoxy resin may be prepared by reacting a mixture of the bisphenol A based epoxy resin with the disbasic acid in the presence of an esterifying catalyst such as tri-n-butylamine and an organic solvent at a reaction temperature of 120 to 180° C. for about 1 to 4 hours.

The modified bisphenol A based epoxy resin is such that the dibasic acid molecular chain acts as a plasticizing component and improve adhesion properties, resulting in that use of the modified epoxy resin as the bisphenol A based epoxy resin (a) is advantageous in improving fabricating properties and corrosion resistance of the resulting coating film.

Composite Bisphenol Based Epoxy Resin (b)

The composite bisphenol based epoxy resin (b) is a bisphenol based epoxy resin having a bisphenol A skeletal structure and a bisphenol F skeletal structure in one molecule. In the present specification, the bisphenol A skeletal structure is represented by the following chemical formula (1), and the bisphenol F skeletal structure is represented by the following chemical formula (2).

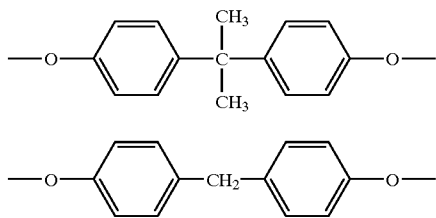

The composite bisphenol based epoxy resin (b) preferably has a number average molecular weight in the range of 4,000 to 30,000, preferably 5,000 to 30,000, and an epoxy equivalent in the range of 2,000 to 10,000, preferably 2,500 to 10,000 from the standpoints of dispersion stability in the aqueous medium, fabrication properties and hygienic properties of the resulting coating film.

The composite bisphenol based epoxy resin (b) may be a bisphenol based epoxy resin having the bisphenol A skeletal structure and the bisphenol F skeletal structure in one molecule, and a mixing ratio of the bisphenol A skeletal structure to the bisphenol F skeletal structure may not particularly be limited, but an equivalent ratio of bisphenol A skeletal structure/bisphenol F skeletal structure in one molecule is preferably in the range of 90/10 to 20/80 on an average.

The composite bisphenol based epoxy resin (b) may be prepared, for example, by combining at least one bisphenols selected from bisphenol A and bisphenol F and at least one glycidyl ethers selected from a relatively low epoxy equivalent bisphenol A based glycidyl ether and a relatively low epoxy equivalent bisphenol F based glycidyl ether so as to contain the bisphenol A skeletal structure and the bisphenol F skeletal structure, followed by subjecting to addition reaction.

The above bisphenol A, bisphenol F, the relatively low epoxy equivalent bisphenol A based glycidyl ether and the relatively low epoxy equivalent bisphenol F based glycidyl ether may be referred to as "Bis A", "Bis F", "A based Ep" and "F based Ep" respectively.

The above combination in the preparation of the composite bisphenol based epoxy resin (b) may include, for example, (1) Bis F and A based Ep, (2) Bis A and F based Ep, (3) Bis F, F based Ep and A based Ep, (4) Bis A, F based Ep, A based Ep, (5) Bis F, Bis A and F based Ep, (6) Bis F, Bis A, A based Ep, and (7) Bis F, Bis A, F based Ep and A based Ep. A mixing ratio in the above combinations is in such an amount that the composite bisphenol based epoxy resin obtained by the addition reaction has the bisphenol A skeletal structure and the bisphenol F skeletal structure in one molecular.

The relatively low epoxy equivalent bisphenol A based glycidyl ether preferably include ones having an epoxy equivalent in the range of about 160 to about 2,000, preferably about 160 to about 1,000, and commercially available ones, for example, Epikote 828 EL, Epikote 1001, Epikote 1004 and Epikote 1007 (trade names, marketed by Japan Epoxy Resin Co., Ltd. respectively); Araldite AER 250, Araldite AER 260, Araldite AER 6071, Araldite AER 6004 and Araldite AER 6007 (trade names, marketed by Asahi Kasei Epoxy Co., Ltd. respectively); Epomik R140, Epomik R301, Epomik R304 and Epomik R307 (trade names, marketed by Mitsui Chemicals, respectively); A dekaresin EP-4100 and Adekaresin EP-5100 (trade names, marketed by Asahi Denka Kogyo K. K., respectively), and the like.

The relatively low epoxy equivalent bisphenol F based glycidyl ether may preferably include ones having an epoxy equivalent in the range of about 140 to about 2,000, preferably about 140 to about 1,000, and commercially available ones, for example, Epikote 807 and Epikote 806H (trade names, marketed by Japan Epoxy Resin Co., Ltd. respectively), Epomik R- 114 (trade name, marketed by Mitsui Chemicals), Adekaresin EP-4900 (trade name, marketed by Asahi Denka Kogyo K. K.), Epiclon 830 (s) (trade name, marketed by Dainippon Ink and Chemicals Inc.), Epototo YDF-170 (trade name, marketed by Tohto Kasei Co., Ltd.), and the like.

The composite bisphenol based epoxy resin (b) may include a modified epoxy resin modified with a dibasic acid, and the modified epoxy resin may be prepared, for example, by (1) a method which comprises modifying a bisphenol based epoxy resin having the bisphenol A skeletal structure and the bisphenol F skeletal structure in one molecule with a dibasic acid, (2) a method which comprises reacting a mixture of a relatively low epoxy equivalent bisphenol A based glycidyl ether (A based Ep) and a relatively low epoxy equivalent F based glycidyl ether (F based Ep) with a dibasic acid, and the like.

The bisphenol based epoxy resin having the bisphenol A skeletal structure and the bisphenol F skeletal structure in one molecule as in the above method (1) may preferably include epoxy resins obtained by the same preparation method as in the epoxy resin (b) except for non-modified composite bisphenol based epoxy resin (b) and a low molecular weight and having a number average molecular weight in the range of 2,000 to 8,000, and an epoxy equivalent in the range of 1,000 to 4,000. The dibasic acid used in the above methods (1) and (2) may include the same dibasic acid as used in the preparation of the modified bisphenol A based epoxy resin modified by the dibasic acid and included in the bisphenol A based epoxy resin (a).

In the above methods (1) and (2), a mixture of an epoxy component such as the bisphenol based epoxy resin or the glycidyl ether and dibasic acid may reacted in the presence of an esterifying catalyst such as tri-n-butylamine and an organic solvent at a reaction temperature of 120 to 180° C. for about 1 to 4 hours to obtain a modified epoxy resin included in the composite bisphenol based epoxy resin (b).

The modified epoxy resin modified with the dibasic acid and included in the composite bisphenol based epoxy resin (b) is such that the dibasic acid molecular chain introduced into the molecule of the epoxy resin acts as a plasticizing agent so as to achieve improvement in adhesion properties, resulting in that the modified epoxy resin is advantageous in improving fablication properties and anticorrosive properties of the resulting coating film.

In the case where a mixture of the bisphenol A based epoxy resin (a) and the composite bisphenol based epoxy resin (b) is used as the epoxy resin (A) used in the preparation of the acrylic-modified epoxy resin, a mixing ratio of (a) to (b) is such that a solid content weight ratio of (a)/(b) is preferably in the range of 10/90 to 90/10, preferably 25/75 to 70/30 from the standpoints of retorting resistant properties, adhesion properties, anticorrosive resistance, etc. of the coating film.

The epoxy resin (A) may also include an epoxy resin prepared by subjecting the above exemplified epoxy resins as the epoxy resin (A) to extraction•washing post treatment to remove the low molecular weight component including unreacted bisphenol A.

Carboxyl Group-Containing Acrylic Resin (B)

The carboxyl group-containing acrylic resin (B) (hereinafter may be referred to as acrylic resin (B)) used in the preparation of the acrylic-modified epoxy resin by reacting with the epoxy resin (A) is an acrylic copolymer containing, as the essential monomer component, a polymerizable unsaturated carboxylic acid such as acrylic acid, methacrylic acid, maleic acid, itaconic acid, fumaric acid and the like. The copolymer preferably has a weight average molecular weight in the range of 5,000 to 100,000, preferably 10,000 to 100,000, and a resin acid value in the range of 150 to 450 mg KOH/g, preferably 200 to 450 mg KOH/g from the standpoints of stability in the aqueous medium, and fabrication properties, retorting resisting properties, flavor properties and the like of the resulting coating film.

Monomer components other than the polymerizable unsaturated carboxylic acid used in the polymerization of the acrylic resin (B) may include, for example, $C_{1-15}$ atkyl esters of acrylic acid or methacrylic acid such as methyl (meth)acrylate, ethyl (meth)acrylate, propyl (meth)acrylate, n-butyl (meth)acrylate, i-butyl (meth)acrylate, t-butyl (meth)acrylate, 2-exhylhexyl (meth)acrylate, lauryl (meth) acrylate, benzyl (meth)acrylate, stearyl (meth)acrylte, cetyl (meth)acrylate and the like; cyclohexyl (meth)acrylate, isoburnyl (meth)acrylate; aromatic vinyl monomer such as styrene, α-methylstyrene, vinyl toluene and the like; hydroxyl group-containing polymerizable unsaturated monomer including hydroxyalkyl (meth)acrylate such as 2-hydroxyethyl (meth)acrylate, hydroxypropyl (meth) acrylate, hydroxybutyl (meth) acrylate, hydroxyamyl (meth) acrylate, hydroxyhexyl (meth)acrylate and the like, and hydroxyl group-containing caprolactone-modified alkyl (meth)acrylate prepared by subjecting one mole of hydroxyalkyl (meth)acrylate such as hydroxyethyl (meth)acrylate and the like and 1 to 5 moles of ε-caprolactone to a ring opening addition reaction; acrylamide monomer such as acrylamide, methacrylamide, N-methoxymethyl (meth) acrylamide, N-ethoxymethyl (meth)acrylamide, N-n-propoxymethyl (meth)acrylamide, N-isopropoxymethyl (meth)acrylamide, N-n-butoxymethyl (meth)acrylamide, N-sec-butoxymethyl (meth)acrylamide, N-tert-butoxymethyl (meth)acrylamide, and the like; acrylonitride, methacrylonitride, vinyl acetate, ethylene, butadiene, and the like.

The acrylic resin (B) may be prepared by heating and copolymerizing a monomer mixture of the polymerizable unsaturated carboxylic acid and the other monomer component, for example, in an organic solvent and in the presence of a radical polymerization initiator or a chain transfer agent at 80 to 150° C. for 1 to 10 hours. The polymerization initiator may include organic peroxide polymerization initiators such as benzoyl peroxide, t-butylperoxy-2-ethyl hexanoate, di-t-butyl peroxide, t-butylperoxybenzoato, t-amylperoxy-2-ethylhexanoate and the like, and azo polymerization initiators such as azobisisobutylonitrile, azobisdimethylvaleronitrile and the like. The chain transfer agent may include α-methylstyrene dimer, mercaptan and the like.

Preparation of Acrylic-Modified Epoxy Resin

The acrylic-modified epoxy resin (C) in the present invention is prepared by reacting the epoxy resin (A) and the carboxyl group-containing acrylic resin (B) in the presence of an amine compound.

The reaction between the epoxy resin (A) and the carboxyl group-containing acrylic resin (B) may be carried out by heating and esterifying in an organic solvent, for example, and in the presence of a tertiary amine compound such as triethylamine, dimethyl ethanolamine, triethanolamine, monomethyl diethanolamine, morpholine an the like as the esterifying catalyst at 80 to 120° C. for 0.5 to 8 hours to obtain an acrylic-modified epoxy resin (C). A mixing amount of the amine compound is in the range of 1 to 10% by weight based on a total solid content of the resins (A) and (B). A mixing amount more than the above range undesirably increase a proportion of a quaternary ammonium salt-forming reaction on the esterification reaction.

A mixing ratio of the epoxy resin (A) to the acrylic resin (B) may be arbitrarily be selected depending on coating workability and coating film performances, but a solid content weight ratio of (A)/(B) is in the range of 10/90 to 95/5, preferably 60/40 to 90/10.

The acrylic-modified epoxy resin (C) obtained by the esterification reaction preferably has an acid value in the range of 20 to 120 mg KOH/g, preferably 30 to 100 mg KOH/g. An acid value less than 20 mg KOH/g makes impossible to obtain dispersion stability in the aqueous medium. On the other hand, an acid value more than 120 mg KOH/g raises problems of eluation of bisphenol A from the resulting coating film, and of undesirable water resistance. Preferably, the acrylic-modified epoxy resin (C) essentially has no epoxy group from the standpoint of storage stability.

The acrylic-modified epoxy resin (C) is neutralized and dispersed into an aqueous medium, and a neutralizing agent used for the above neutralization may preferably include amines and ammonia.

Typical examples of the amines may include triethylamine, triethanolamine, dimethyl ethanolamine, diethyl ethanolamine, morpholine and the like. Of these, triethylamine and dimethyl ethanolamine are preferable. A degree of neutralization of the acrylic-modified epoxy resin is in the range of 0.2 to 2.0 equivalent of neutralization relative to carboxyl group in the resin.

In the present invention, an amount of a quaternary ammonium salt formed during the esterification reaction and neutralization and contained in the acrylic-modified epoxy resin is essentially controlled in the range of $3.0 \times 10^{-4}$ mol or less, preferably $2.5 \times 10^{31 \, 4}$ mol per one gram of the resin. An amount of the quaternary ammonium salt more than $3.0 \times 10^{-4}$ mol per one gram of the resin undesirably raises problems of eluation of bisphenol A from the resulting coating film. Measurement of the amount of the quaternary ammonium salt is carried out by an electrical conductivity titration method as disclosed in Japanese Patent Application Laid-Open No. 160029/96. That is, an indicator solution prepared by dissolving an indicator having sulfonic group and hydroxyl group as functional groups into a solvent is dropped into a sample solution prepared by dissolving a sample after starting a reaction into a solvent to carry out a titration reaction, followed by plotting a relationship between a titer and an electrical conductivity for a first titration reaction step of reacting the indicator and a quaternary ammonium saltized epoxy compound to form both sulfonic group and hydroxyl group-ionized indicator and carboxylic acid, and for a second titration reaction step of reacting the indicator and the ionized indicator to form only sulfonic group-ionized indicator respectively, determining a titer t1 in the first titration reaction step from a titer at an intersecting point between a straight line along plots in the first titration reaction step and a straight line along plots in the second titration reaction step, and determining an amount (mol/g) of quaternary ammonium salt per one gram of a solid content of the sample in accordance with the following formula (1):
Amount of Quaternary $$\text{ammonium salt } (mol/g) = t1 \ (ml) \times 2 \times \text{concentration of indicator } (mol/1) \times (1/1000) \times \{100/(\text{sample } (g) \times \text{solid content } (\%))\} \quad (1).$$

The aqueous medium, into which the acrylic-modified epoxy resin is dispersed, may include water and a mixture of water with an organic solvent. The organic solvent may include any known organic solvents miscible with water and capable of keeping stability in the aqueous medium of the acrylic-modified epoxy resin. The organic solvent may include, for example, alcohol solvent, cellosolve solvent, carbitol solvent and the like. Specific examples of the organic solvent may include alcohol solvent such as n-butanol; cellosolve solvent such as ethylene glycol monobutyl ether, ethylene glycol monoisopropyl ether, ethylene glycol monomethyl ether, propylene glycol monomethyl ether and the like; carbitol solvent such as diethylene glycol monoethyl ether and the like, and the like. Other inactive organic solvents immiscible with water may also be used as the above organic solvent in such an amount as not to impair stability in the aqueous medium of the acrylic-modified epoxy resin, and may include, for example, aromatic hydrocarbons such as toluene, xylene and the like, esters such as ethyl acetate, butyl acetate and the like, and ketones such as methyl ethyl ketone and the like. An amount of the organic solvent in the water based coating composition of the present invention may be so as to be in the range of 50% by weight or less in the aqueous medium from the standpoint of an environmental protection.

A method of neutralizing and dispersing the acrylic-modified epoxy resin (C) into the aqueous medium may include, for example, a method which comprises slowly adding the acrylic-modified epoxy resin to an aqueous medium containing a neutralizing agent with agitation, a method which comprises neutralizing the acrylic-modified epoxy resin (C) with a neutralizing agent, followed by adding an aqueous medium to a neutralized product or by adding the neutralized product to the aqueous medium, and the like.

The water based coating composition of the present invention may also be prepared further by subjecting a polymerizable unsaturated monomer to seed polymerization in an aqueous dispersion obtained by the neutralization of the acrylic-modified epoxy resin (C).

The polymerizable unsaturated monomer used in the seed polymerization may arbitrarily be selected from examples of the polymerizable unsaturated carboxylic acid and other monomer components as used in the polymerization of the acrylic resin (B), preferably include styrene and $C_{1-24}$ alkyl esters of acrylic acid, more preferably combinations of styrene and alkyl esters having 4 or more carbon atoms of acrylic acid in that an interparticle polymerization in the water dispersion can be sufficiently performed, and that a coating film having good film performances can be formed. Polymerization conditions of temperature and time in seed polymerization may vary depending on kinds of monomers and initiators, but is such that the reaction temperature is in the range of about 30 to 100° C., and the reaction time is in the range of 30 minutes to 10 hours. A solid content of the resin dispersion obtained by seed polymerization may not particularly be limited, but usually is in the range 10 to 70% by weight.

A mixing amount of the polymerizable unsaturated monomer is suitably in the range of 2 to 50 parts by weight per 100 parts by weight of the solid content of the acrylic-modified epoxy resin (C).

The initiator used in the seed polymerization may preferably include a redox catalyst, specifically a combination of a reducing agent such as ammonium bisulfite and an oxidizing agent such as t-butylhydroperoxide.

In addition to the water based coating composition prepared by neutralizing and dispersing the acrylic-modified epoxy resin (C) into the aqueous medium, and the water based coating composition prepared by subjecting the polymerizable unsaturated monomer to seed polymerization in a water dispersion obtained by neutralizing the acrylic-modified epoxy resin (C), the water based coating composition of the present invention may also include, in addition to the above water based coating compositions, may optionally contain curing agents such as resol based phenol resin, novolak based phenol resin, melamine resin, benzoguanamine resin and the like, surface active agents, waxes, anti-foaming agents, pigments, perfumes and the like.

The water based coating composition of the present invention may be applied onto various kinds of coating substrates, for example, untreated or surface treated metal plates such as aluminum plate, tin-free steel plate, tinplate and the like; precoated metal plates prepared by applying a primer coating such as epoxy based primer coating, vinyl based primer coating and the like to the above metal plates respectively; molded metal plates prepared by fabricating the above metal plates and precoated metal plates in the form of a can or the like, and the like.

The method of coating the water based coating composition of the present invention may include any known methods, for example, roll coater coating, spray coating, dip coating, electrodeposition coating and the like. Of these, the spray coating is preferable. A coating film thickness from the water based coating composition of the present invention may arbitrarily be selected depending on uses, but is such that a dry film thickness is in the range of 3 to 20 μm. Drying conditions of the coating film are such that a substrate-reaching maximum temperature is in the range of 150 to 300° C. and a drying time is in the range of 5 seconds to 30 minutes, preferably 200 to 280° C. and 10 seconds to 2 minutes.

Increase of the amount of bisphenol A eluated from the coating film with increase of the heat curing temperature of the coating film may be caused by the thermal decomposition of the epoxy resin, and consequently it is guessed that the quaternary ammonium salt or carboxylate ion may act as a catalyst on the thermal decomposition of the epoxy resin.

Thus, according to the water based coating composition of the present invention, control of the amount of the quaternary ammonium salt in the acrylic-modified epoxy resin (C) within a specified range makes it possible to form a coating film not eluating bisphenol A without reducing coating film performances demanded on the coating film applied onto the internal surface of a can.

EXAMPLE

The present invention is explained more in detail by the following Preparation Examples, Examples and Comparative Examples, in which "part" and "%" represent "part by weight" and "% by weight" respectively.

Preparation of Carboxyl Group-Containing Acrylic Resin (B) Solution

Preparation Example 1

Under a nitreogen atmosphere, 850 parts of n-butanol was heated at 100° C., followed by dropping the following vinyl monomers and polymerization intiator over 3 hours, aging for one hour, dropping a mixed solution of 10 parts of t-butylperoxy-2-ethylhexanoale and 100 parts of n-butanol over 30 minutes, aging for 2 hours, and adding 933 parts of n-butanol and 400 parts of ethylene glycol monobutyl ether to obtain a carboxyl group-containing acrylic resin (B-1) having a solid content of about 30%, a resin acid value of 300 mg KOH/g and a weight average molecular weight of about 17,000.

| | |
|---|---|
| methacrylic acid | 450 parts |
| styrene | 450 parts |
| ethyl acrylate | 100 parts |
| t-butylperoxy-2-ethylhexanoate | 40 parts |

Preparation Example 2

Under a nitrogen atmosphere, 1400 parts of n-butanol was heated at 100° C., followed by dropping the following vinyl monomers and polymerization initiator over 3 hours, aging for one hour, dropping a mixed solution of 10 parts of t-butylperoxy-2-ethylhexanoate and 100 parts of n-butanol over 30 minutes, aging for 2 hours, adding 373 parts of n-butanol and 400 parts of ethylene glycol monobutyl ether to obtain a carboxyl group-containing acrylic resin (B-2) having a solid content of about 30%, a resin acid value of 450 mg KOH/g and a weight average molecular weight of about 14,000.

| | |
|---|---|
| methacrylic acid | 670 parts |
| styrene | 250 parts |
| ethyl acrylate | 80 parts |
| t-butylperoxy-2-ethylhexanoate | 50 parts |

Preparation of Acrylic-Modified Epoxy Resin (C)

Preparation Example 3

A reactor was charged with 513 parts of Epikote 828 EL (trade name, epoxy resin marketed by Japan Epoxy Resin Co., Ltd., epoxy equivalent: about 190, number average molecular weight: about 380), 287 parts of bisphenol A, 0.3 part of tetramethylammonium chloride and 89 parts of methyl isobutyl ketone, followed by heating at 140° C. under nitrogen atmosphere, reacting for about 4 hours to obtain an epoxy resin solution containing an epoxy resin having an epoxy equivalent of 3,700 and a number average molecular weight of 17,000, adding 667 parts of the carboxyl group-containing acrylic resin (B-1) having a solid content of about 30% and obtained in Preparation Example 1 to the epoxy resin solution, heating at 90° C. to dissolve uniformly, dropping 40 parts of deionized water at that temperature over 30 minutes, adding 30 parts of dimethyl ethanolamine, reacting for one hour with agitation, and adding 2380 parts of deionized water over one hour to obtain a water dispersion (C-1) having a solid content of about 25% of an acrylic-modified epoxy resin having a resin acid value of 48 mg KOH/g and containing $1.2 \times 10^{-4}$ mol/g of quaternary ammonium salt (determined by the electrical conductivity titration method).

The amount of the quaternary ammonium salt was determined as follows. That is, a relationship between a titer and an electrical conductivity for a first titration reaction step and a second titration reaction step was plotted respectively by use of a mixed solution of dimethyl sulfoxide/dioxane (weight ratio)=20/80 as the solvent and bromophenol blue as the titration indicator, followed by determining a titer at an intersecting point between a straight line along plots in the first titration reaction step and a straight line along plots in the second titration reaction step to determine the amount of the quaternary ammonium salt.

Preparation Example 4

Preparation Example 3 was duplicated except that 50 parts of dimethyl ethanolamine was used to obtain a water dispersion (C-2) having a solid content of about 25% of an acrylic-modified epoxy resin having a resin acid value of 48 mg KOH/g and $2.1 \times 10^{-4}$ mol/g (determined according to the electrical conductivity titration method) of quaternary ammonium salt.

Preparation Example 5

A reactor was charged with 481 parts of Epikote 828 EL (trade name, epoxy resin marketed by Japan Epoxy Resin Co., Ltd., epoxy equivalent: about 190, number average molecular weight: about 380), 269 parts of bisphenol A, 0.3 part of tetramethyl ammonium chloride and 83 parts of methyl isobutyl ketone, followed by heating at 140° C. under nitrogen atmosphere, reacting for about 4 hours to obtain an epoxy resin solution containing an epoxy resin having an epoxy equivalent of 3,700 and a number average molecular weight of 17,000, adding 833 parts of the carboxyl group-containing acrylic resin (B-1) having a solid content of about 30% and obtained in Preparation Example 1 to the epoxy resin solution, heating at 90° C. to dissolve uniformly, dropping 40 parts of deionized water at that temperature over 30 minutes, adding 30 parts of dimethyl ethanolamine, reacting for one hour with agitation, and adding 2260 parts of deionized water over one hour to obtain a water dispersion (C-3) having a solid content of about 25% of an acrylic-modified epoxy resin having a resin acid value of 63 mg KOH/g and containing $1.3 \times 10^{-4}$ mol/g of quaternary ammonium salt (determined by the electrical conductivity titration method).

Preparation Example 6

A reactor was charged with 519 parts of Epikote 828 EL (trade name, epoxy resin marketed by Japan Epoxy Resin Co., Ltd., epoxy equivalent: about 190, number average molecular weight: about 380), 281 parts of bisphenol A, 0.3 part of tetramethylammonium chloride and 89 parts of methyl isobutyl ketone, followed by heating at 140° C. under nitrogen atmosphere, reacting for about 4 hours to obtain an epoxy resin solution containing an epoxy resin having an epoxy equivalent of 2,800 and a number average molecular weight of 12,000, adding 667 parts of the carboxyl group-containing acrylic resin (B-2) having a solid content of about 30% and obtained in Preparation Example 2 to the epoxy resin solution, heating at 90° C. to dissolve uniformly, dropping 40 parts of deionized water at that temperature over 30 minutes, adding 53 parts of dimethyl ethanolamine, reacting for one hour with agitation, and adding 2350 parts of deionized water over one hour to obtain a water dispersion (C-4) having a solid content of about 25% of an acrylic-modified epoxy resin having a resin acid value of 75 mg KOH/g and containing $1.8 \times 10^{-4}$ mol/g of quaternary ammonium salt (determined by the electrical conductivity titration method).

Preparation Example 7

A reactor was charged with 800 parts of water dispersion (C-2) having a solid content of about 25% of acrylic-modified epoxy resin as obtained in Preparation Example 4, 150 parts of deionized water, 25 parts of styrene, 25 parts of butyl acrylate and 0.17 part of t-butylhydroperoxide, followed by heating at 70° C. under nitrogen atmosphere, adding 0.3 part of 50% ammonium bisulfite solution, reacting at that temperature for 3 hours to obtain a water dispersion (C-5) having a solid content of about 25% of acrylic-modified epoxy resin having a resin acid value of 38 mg KOH/g and $1.7 \times 10^{-4}$ mol/g (determined by the electrical conductivity titration method) of quaternary ammonium salt.

Preparation Example 8 (for Comparison)

A reactor was charged with 524 parts of Epikote 828 EL (trade name, epoxy resin marketed by Japan Epoxy Resin Co., Ltd., epoxy equivalent: about 190, number average molecular weight: about 380), 276 parts of bisphenol A, 0.3 part of tetramethylammonium chloride and 89 parts of methyl isobutyl ketone, followed by heating at 140° C. under nitrogen atmosphere, reacting for about 3 hours to obtain an epoxy resin solution containing an epoxy resin having an epoxy equivalent of 2,200 and a number average molecular weight of about 5,000, adding 667 parts of the carboxyl group-containing acrylic resin (B-2) having a solid content of about 30% and obtained in Preparation Example 2 to the epoxy resin solution, heating at 90° C. to dissolve uniformly, dropping 40 parts of deionized water at that temperature over 30 minutes, adding 75 parts of dimethyl ethanolamine, reacting for one hour with agitation, and adding 2330 parts of deionized water over one hour to obtain a water dispersion (C-6) having a solid content of about 25% of an acrylic-modified epoxy resin having a resin acid value of 70 mg KOH/g and containing $3.2 \times 10^{-4}$ mol/g of quaternary ammonium salt (determined by the electrical conductivity titration method).

Preparation of Water Based Coating Composition

Example 1

A coating composition preparation vessel was charged with 100 parts of water dispersion (C-1) of the acrylic-modified epoxy resin prepared in Preparation Example 3, 3 parts of phenolic resin solution (Hitanol 3305N, trade name, marketed by Hitachi Chemical Co., Ltd., cresol/p-tert-butylphenol/formaldehyde based phenolic resin solution, solid content; about 42%), 0.5 part of Michemlube 160 F (trade name, marketed by Michelman Inc., carnauba wax dispersion, solid content: 10%) and 28 parts of deionized water, followed by stirring to obtain a water based coating composition having a solid content of 20%.

Examples 2–8 and Comparative Examples 1–2

Example 1 was duplicated except that water dispersions of acrylic-modified epoxy resins, phenolic resin solution and wax were formulated so shown in Table 1 and that the amount of deionized water was controlled so that the solid content may be 20% respectively to obtain water based coating compositions having a solid content of about 20%.

Respective water based coating compositions obtained in Examples 1–8 and Comparative Examples 1–2 were coated uniformly by spray coating onto the internal surface of a two-piece steel can having an internal volume of 350 ml so as to be a dry coating film coating weight in the range of 150 to 170 mg per one can, followed by drying at 200° C. for about one minute to form a coating film respectively. Respective coating cans obtained as above were subjected to coating film performance tests according to the following test methods.

Test Method

Amount of Exacted Bisphenol A (ppb)

A coating can sample was charged with 340 ml of distilled water, followed by rolling, subjecting to extraction treatment at 125° C. for 30 minutes, and subjecting to high speed liquid chromatography analysis to determine a bisphenol A concentration (ppb) in water as an amount of extracted bisphenol A.

Flavor Properties

A coating can sample was charged with 340 ml of an active carbon-treated tap water, followed by rolling, sterilizing at 100° C. for 30 minutes, preserving at 37° C. for 3 months to examine flavor according to the following criterion.

4: No changes; 3 extremely slight changes;

2: some changes; 1: remarkable changes.

Hygienic Properties

A coating can sample was charged with 340 ml of deionized water, followed by rolling, treating at 125° C. for 30 minutes to determine potassium permanganate consumed according to the test method defined in accordance with the Food Sanitation Act, and evaluating hygienic properties. The potassium permanganate consumed is represented in terms of ppm.

4:0 ppm or more, but less than 2 ppm;

3:2 ppm or more, but less than 5 ppm;

2:5 ppm or more, but less than 10 ppm;

1:10 ppm or more.

Retorting Resistant Properties

A body of a coating can sample was cut open to form a coating plate, followed by repair coating the edge faces of the coating plate to form a test piece, cross cutting the coating film of the test piece, dipping into a boiling water at 125° C. for 30 minutes, drying the coating film at room temperature, and evaluating the appearance and adhesion properties of the coating film as follows.

Appearance of the coating film was visually evaluated by a degree of whitening of the coating film as follows.

2: No changes; 1: whitening developed.

Adhesion properties of the coating film was evaluated by adhering an adhesive cellophane tape onto the surface of the cross-cut coating film obtained as above, followed by strongly peeling to examine the surface of the crosscut coating film as follows.

4: No peelings; 3: extremely slight peelings; 2: slight peelings; 1: remarkable peelings.

Fabrication Properties

A body of a coating can sample was cut open, followed by cutting to a size of 40 mm×50 mm to form a test piece, folding double the test piece so that the coating film of the test piece may be outside and that a length of the folded portion as the testing portion may be 40 mm, inserting two sheets of a 0.23 mm thick tin-free steel inside the twice-folded test piece, allowing to fall down a load of 3 kg from a height of 42 cm onto the folded portion, energizing 6.5 V×6 seconds at folded edge portions, determining an electric current (mA) in a 2 cm side fabricated portion to evaluate as follows.

4: less than 1 mA; 3:1 mA or more, but less than 3 mA;

2:3 mA or more, but less than 10 mA; 1:10 mA or more.

TABLE 1

|  |  | Examples |  |  |  |  |  |  |  | Comparative Examples |  |
|---|---|---|---|---|---|---|---|---|---|---|---|
|  |  | 1 | 2 | 3 | 4 | 5 | 6 | 7 | 8 | 1 | 2 |
| Acrylic-modified epoxy resin (C) | kind | C-1 | C-1 | C-2 | C-3 | C-3 | C-4 | C-5 | C-5 | C-6 | C-6 |
|  | amount | 100 | 100 | 100 | 100 | 100 | 100 | 100 | 100 | 100 | 100 |
| Phenolic resin | amount | 3 | 0 | 0 | 3 | 0 | 0 | 0 | 3 | 0 | 3 |
| Michemlube 160F | amount | 0.5 | 0.5 | 0.5 | 0.5 | 0.5 | 0.5 | 0.5 | 0.5 | 0.5 | 0.5 |
| Test results |  |  |  |  |  |  |  |  |  |  |  |
| Amount of extracted bisphenol A (ppb) |  | None |  |  |  |  |  |  |  | 5 | 5 |
| Flavor properties |  | 4 | 4 | 4 | 4 | 4 | 4 | 4 | 4 | 4 | 4 |
| Hygienic properties |  | 4 | 4 | 4 | 4 | 4 | 4 | 4 | 4 | 4 | 4 |
| Retorting resistant properties | appearance | 2 | 2 | 2 | 2 | 2 | 2 | 2 | 2 | 2 | 2 |
|  | adhesion properties | 4 | 4 | 4 | 4 | 4 | 3 | 4 | 4 | 3 | 4 |
| Fabrication properties |  | 4 | 4 | 3 | 3 | 3 | 3 | 3 | 3 | 3 | 3 |

What is claimed is:

1. A water based coating composition prepared by reacting an epoxy resin (A) having a bisphenol A skeletal structure and a carboxyl group-containing acrylic resin (B) in the presence of an amine compound to form an acrylic-modified epoxy resin (C), and neutralizing and dispersing the acrylic-modified epoxy resin (C) into an aqueous medium, an amount of a quaternary ammonium salt in the acrylic-modified epoxy resin (C) being in the range of $3.0 \times 10^{-4}$ mol or less per one gram of the resin.

2. A composition as claimed in claim 1, wherein the epoxy resin (A) is a bisphenol based epoxy resin having a number average molecular weight in the range of 4,000 to 30,000, and an epoxy equivalent in the range of 2,000 to 10,000.

3. A composition as claimed in claim 1, wherein the carboxyl group-containing acrylic resin (B) has a weight average molecular weight in the range of 5,000 to 100,000, and a resin acid value in the range of 150 to 450 mg KOH/g.

4. A composition as claimed in claim 1, wherein a mixing ratio of the epoxy resin (A) to the carboxyl group-containing acrylic resin (B) in the preparation of the acrylic-modified epoxy resin (C) is such that a solid content weight ratio (A)/(B) is in the range of 10/90 to 95/5.

5. A composition as claimed in claim 1, wherein the acrylic-modified epoxy resin (C) has a resin acid value in the range of 20 to 120 mg KOH/g.

6. A composition as claimed in claim 1, wherein the neutralization of the acrylic-modified epoxy resin (C) is further followed by subjecting a polymerizable unsaturated monomer to a seed polymerization in a resulting aqueous dispersion.

7. A composition as claimed in claim 1, wherein said composition further contains a curing agent.

* * * * *